United States Patent [19]

Henry

[11] 3,904,781
[45] Sept. 9, 1975

[54] METHOD OF PREPARING CELLS FOR INSPECTION

[76] Inventor: Donald E. Henry, 983 Memorial Dr., Cambridge, Mass. 02138

[22] Filed: Oct. 15, 1973

[21] Appl. No.: 406,251

[52] U.S. Cl. .................... 427/2; 350/93; 350/95; 424/3; 427/282; 427/287; 427/372; 427/378; 428/210
[51] Int. Cl.² ................... G02B 21/34; A01N 1/00
[58] Field of Search ........ 117/48, 38, 124 R, 124 D, 117/3; 23/253 R, 253 TP; 350/95, 93; 424/3

[56] References Cited
UNITED STATES PATENTS

| | | | |
|---|---|---|---|
| 2,090,914 | 8/1937 | Porter | 350/95 |
| 2,302,830 | 11/1942 | Axelrad | 350/95 |
| 2,342,409 | 2/1944 | Levy | 424/13 |
| 3,031,924 | 5/1962 | Lamal | 350/95 |
| 3,141,548 | 7/1964 | Newby | 350/95 X |
| 3,580,658 | 5/1971 | Swanson | 350/93 |
| 3,736,042 | 5/1973 | Markovits et al. | 350/95 |

OTHER PUBLICATIONS

Beck, The Microscope, pp. 54 & 55, (1921).

Primary Examiner—Harry J. Gwinnell
Attorney, Agent, or Firm—Robert A. Cesari; John F. McKenna; Andrew F. Kehoe

[57] ABSTRACT

A process for preparing cells for microscope examination whereby a suspension of the cells is agitated by convection currents caused by the cooling effect of the evaporation of a suspension medium. The process is advantageously carried out in a shallow well formed of a microscopic slide bottom member and of a wall-forming ring. In some embodiments of the invention a dark-colored pattern comprises a means to distribute radiant heat and, consequently, cell population, over the slide surface.

18 Claims, 9 Drawing Figures

PATENTED SEP 9 1975

3,904,781

METHOD OF PREPARING CELLS FOR INSPECTION

BACKGROUND OF THE INVENTION

There is a considerable problem in preparing samples of physiological specimens for visual inspection, e.g., for inspection through a microscope. These problems arise primarily from the difficulty of obtaining a uniform distribution of the cells on the surface to be inspected. Often the distributing problems are the result of excessive agglomeration of cells deposited from a liquid medium.

The result of this distribution problem is that a microscopist must exericse unusual care in making sure they have looked at all areas where cells are deposited — a mere discontinuity in cell coverage on a slide will not be indicative that there is no further sample in the scanning path being inspected. Moreover, because the cells are not well distributed on the sample surface, a larger surface must be inspected to assure that, say, a diseased kind of cell has not been segregated in a "clump" of cells in one corner of the slide being inspected.

Over and above the problems associated with distribution per se, it would be desirable to have nonspherical cells orient or arrange themselves so that they will be more clearly definable in three dimensions. Prior art preparations of cells on slides have not contributed any such orientation of the cells.

One well-known technique used in display of cells for inspection is the taking of the sample manually, wiping it onto a glass slide with another glass slide, dipping one of the glass slides in alcohol to fix the smear, sending the fixed smear to the laboratory where it will be stained with whatever dye is appropriate, covering the dyed smear in the laboratory for the first time and then sending it on to another lab station for visual inspection under the microscope. The microscopist has to run up and down with the microscope over the entire sample inspecting the cells which are distributed very badly in agglomerates, or clumps, over the entire surface. The entire procedure lends itself to a high risk of contamination and an attendant risk that very significant cell members of the population will be overlooked, and it takes a lot of time on the part of the microscopist.

Gradually the foregoing procedure is being replaced by the following improved procedure:

The doctor takes a sample and instead of smearing it, he puts it into a test tube and sends it to the lab. The lab spins it down, pours off the supernatant liquid and adds some absolute alcohol to the cell suspension.

The cell suspension is analyzed. It may be analyzed by resuspending it and pouring it onto a slide from which the alcohol will evaporate leaving the cells on the slide. This second procedure is a big improvement over the first procedure primarily because you get a better distribution of cells on the slide, and you run a considerable smaller risk of contamination.

There is a third procedure, one utilizing filter means, which has become very popular over the last 10 years or so. This third procedure came into being primarily because there was a major need to concentrate a small number of cells so that they could be studied. One example of the problem that was faced by the laboratories was frequently receiving spinal tap samples which had so few cells that the laboratory technician could not visually see them. A spinal tap is often such that it can't be repeated again in a short time, and, therefore, it is very important that any cells that are in a spinal tap sample be so concentrated that they can be seen under the microscope. In this filter-type procedure the material is put into absolute alcohol after being spun down much as it is in the second procedure described above. But in the filter process, the material is put through a filter to concentrate the cells in the filter matrix. The filter is then stained and put on a slide. Next, formalin is used to dissolve the filter leaving the stained cells in "concentrated" position. This is a definite advance and there has been considerable commercial success with the process. There is now a further modification of that process, which has an improved filter in that it does not leave a grey background which is left by the action of formalin on the earlier filter — a substantial drawback to the earlier filter system. However, in both the newer and earlier filter processes there is still clumping and piling of cells. Moreover, these filter-type processes do take a substantial amount of laboratory time to implement.

SUMMARY OF THE INVENTION

It is a principal object of the invention to provide an improved process for the preparation of samples of physiological specimens, especially whole-cell-containing specimens.

It is another object of the invention to provide novel apparatus especially useful in carrying out the aforesaid improved process.

A more particular object of the invention is to provide an improved process, and improved apparatus for use therein, for distributing and orienting cells on a surface to which they will adhere and wherein they may be advantageously displayed and preserved.

It is an object to provide apparatus and a process which will achieve the above objects and will do so in a greatly reduced time period and with greatly improved, microscopically apparent, cell definition.

A further object of the invention is to provide means to facilitate identical treatment of different cellular samples and thereby facilitate comparisons of such samples.

Another object of the invention is to provide a superior means for concentrating dilute cellular samples so they may be studied optically.

Other objects of the invention will be obvious to those skilled in the art on reading the present application.

The above objects have been substantially achieved by developing of a process which utilizes a thermal agitation of a cell suspension during that period just before the suspending medium is removed and also makes use of a buoyancy phenomenon which results in deposition of the cells in an improved orientation as well as in an improved distribution over the surface on which they are deposited.

In general, the process of the invention comprises the dispersion of a cellular sample in a liquid, which is volatile at the test temperature of 25° – 35° C.

In order to allow good mixing action and to avoid agglomeration and piling up of cells on the substrate, it is advantageous to keep the cell population of the suspension from being excessive. What is excessive in terms of cell populations per unit volume depends on the depth of the suspension over the substrate and the size of the cell. It is convenient to use an empirical model comprising cells of 56-micron diameter and a model cell suspension depth of 0.125 inch to define such a limit. In this situation, the cell population should not exceed about 125,000 cells per cc of suspension. As larger cells are used the maximum number of cells should be decreased, as smaller cells are used, it may be increased somewhat. Normally, the total number of cells will be between 100 and 140,000 cells per cc.

The above-described suspension is poured into a shallow well with a glass slide or some other such manipulative surface-forming means forming the bottom of the well. The walls of the well are suitably formed by a retainer ring which is placed on the slide surface in sufficiently close contact to effect a seal with the surface of, say, the glass slide. This sealing contact can be assured in several ways including such conventional means as clamps, springs and mechanical brackets. A machined steel surface is entirely suitable because it provides some porosity at the interface between the slide and ring. A bit of liquid can seep into the interstices at this interface and effectively seal the ring into position on the slide so that inadvertent movement of the ring is avoided during handling even in the absence of other mechanical locking or sealing means.

One application of the invention is that two cellular samples may be treated exactly the same, in terms of physical and chemical processing, say on two different areas of the same slide but without danger of cross-contamination.

In general, a ring-slide combination wherein the well is of about 0.5 inch diameter and 0.125 inch deep is entirely convenient.

In any event, it has been found that when the alcohol evaporated from a suspension constrained in such a well as described above, the cooling inherent in the evaporation, together with the temperature-stabilizing effect of the ring material about the edge of the evaporating liquid, sets up a substantial thermal agitation that tends to agitate the cells in circulating eddy currents during substantially the entire period of the evaporation. This agitation provides, lasting as it does until the liquid is substantially gone, a highly effective dispersing effect on the cells.

Moreover, the cells that are acicular (or at least those that deviate substantially from a spherical shape) tend to be buoyed up so that such cells are left "standing on end" so to speak. Thus cells of varying shapes tend to be more clearly identifiable because of this three-dimensional effect of the process.

The slide material, i.e. the bottom of the well, should be formed of glass (or its optical equivalent, as will be obvious to anyone skilled in the microscope). The rings, or walls, of the well can be formed of any convenient substance. Although steel rings are particularly convenient to handle, it has been found that those materials that, because of their wettability characteristics, form relatively small (relatively small meaning less concave in shape) menisci are advantageous because the larger menisci tends to leave a certain amount of clumping or piling of cells near the perimeter of the circle formed by the well. Thus, for example, polymeric materials like polyolefins, polymethylmethacrylate, and other such synthetic organic polymers seem to be advantageously used in forming the walls of the well.

However, as indicated above, metals including steel, nickel, lead, gold, silver, aluminum and the like may also be used as, indeed, may such ceramic materials as porcelain, silica, glass, quartz and the like. Combinations of materials may be used to form the well structures, for example a stainless steel ring with a polytetrafluoroethylene coating on the wall of the ring would be highly acceptable.

In general, the cooling effect described above will find the temperature at the surface near the center of the well cooler than the temperature at the walls of the cell. Of course, it is possible to contrive to substitute this situation with the converse thermal condition. One could artificially cool the walls of the tube to promote a different circulation effect. This procedure is believed to be merely a manipulative equivalent of the above-described procedure wherein the coolest part of the evaporating suspension was described as being in the center of the ring. In practice, the temperature difference between liquid at the center of the ring and along the walls is usually about a degree F or more.

Surprisingly very minor changes in heat distribution can be used to achieve preferential placement of the cells on the substrate. Because the critical time for achieving such preferential placement is shortly before the evaporation of the medium is completed, a means for selective radiant-heating is advantageously positioned at a situs adjacent the bottom of the well. Moreover, since it is desirable to have a transparent slide on which to work as the bottom surface of the well, a radiant heat-receptive structure is advantageously removeably positioned on the opposite side of the transparent slide from the surface on which the cells are to be deposited.

In normal daylight conditions as are generally experienced in many laboratories, an effective preferential distributing of the cells is achieved merely by putting a good radiant-heat-receptive (black, or dark-colored) surface on the bottom of the glass slide. In general, a black-inked surface preferentially reduces the deposition of cells on the surface of the slide just above the black-inked surface. So, for example, a black-inked perimeter placed on a cardboard and just below the outer circumferential area just inside the walls of the well will result not only in diminishing or overcoming any agglomeration of cells due to the meniscus, but will markedly reduce the number of cells in the area below the number achievable with a non-meniscus developing combination of wall and suspension medium.

Thus the invention provides means to form uniform cell dispersions in predetermined geometric patterns related to black-inked (radiant-heat-absorbing) surface.

The process of the invention can be accelerated by the use of evaporation-accelerating means. For example, a cell suspension medium taking 26 minutes to evaporate in a relatively stagnant air environment can be evaporated with favorable results in a small fraction of that time, say about five minutes, when a stream of air is blown across the well. The faster evaporation rate also has the effect of increasing the temperature differentials within the concentrating cell suspension and thereby increases thermal mixing, an increase which facilitates a better distribution of some cell samples.

In the above description, the use of the term "rings" and other descriptive words describing or connoting circular configurations are used. It will be understood by all skilled in the art that circular wells are conventional and convenient but these illustrations in no way intended to omit other shapes such as rectangles, elipses, triangles or whatever may be convenient. The use of a circular well is illustrative only.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

Figure 1:
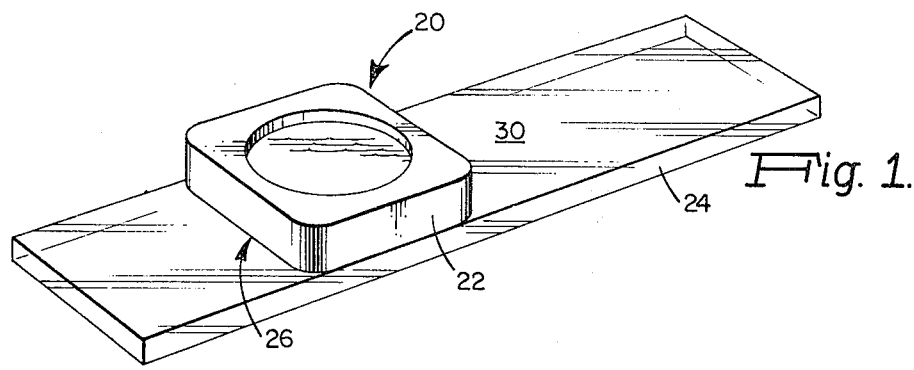
FIG. 1 is a perspective view of apparatus useful in the process of the invention.

FIG. 1 shows a well 20 formed of a steel ring 22 and a transparent glass slide 24. A bottom machined surface 26 of ring 22 allows some of the liquid medium of the cell dispersion to seep between the smooth glass surface 30 and thereby help to stick surfaces 30 and 26 together, thereby facilitating handling of the device.

Figure 2:
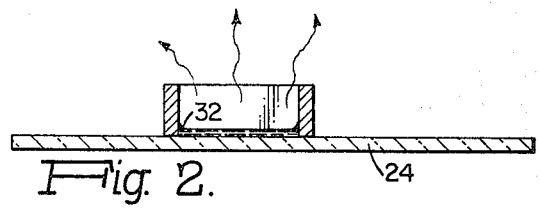
FIG. 2 is a section of the apparatus of FIG. 1 showing a concave meniscus.

FIG. 2 shows the apparatus of FIG. 1 but shows how a concave or positive meniscus 32 provides substantial differences in depth of the cell suspension over different parts of the glass slide as the liquid suspending medium evaporates.

Figure 3:
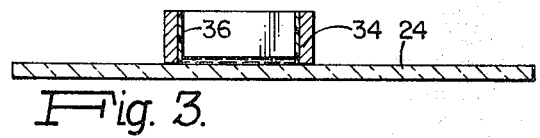
FIGS. 3 and 3A are similar to FIG. 2 excepting they show meniscus-free and convex meniscus embodiment.
Figure 3A:
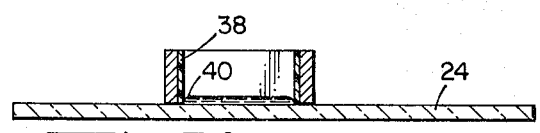

FIGS. 3 and 3A show use of different mediums to achieve menisci of different shapes. FIG. 3 shows the use of a ring 34 clad with plastic 36 to achieve no meniscus. FIG. 3A shows a polyethylene ring 38 and the formation of a convex meniscus 40 by use thereof.

Figure 4:
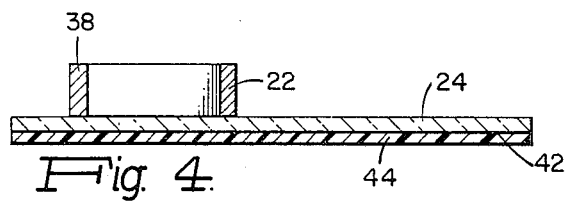
FIG. 4 is similar to FIG. 2 but shows a black-body-type surface placed below the slide.
Figure 5:
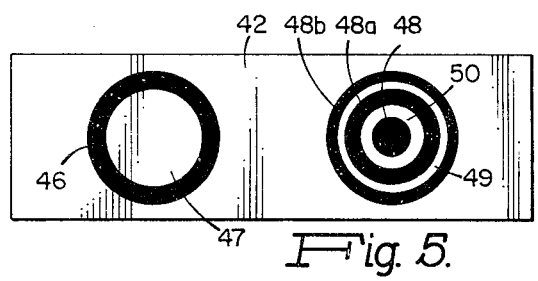
FIG. 5 shows typical configurations of black-body-surface.
Figure 6:
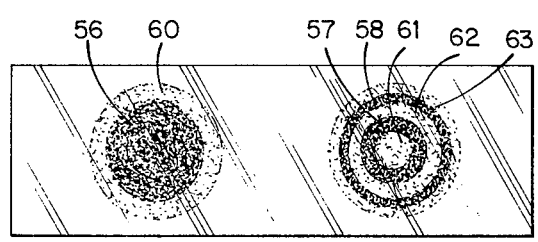
FIG. 6 shows typical cell distribution patterns on a glass slide prepared with the black bodies of FIG. 5.

FIG. 4 illustrates the apparatus of FIG. 1 but with a black radiating (black-body-bearing) surface 42 placed just below the glass slide. Surface 42 is conveniently on a plastic card 44. FIG. 5 shows two possible configurations for a radiating surface. Circle 46 has particular utility in overcoming any cell-piling effect of a concave meniscus. Concentric circles 48 and 48a and 48b cause the preferential deposition of cells in concentric circles on the microscope slide which circles correspond to the lighter-colored areas between the dark circles. These effects are shown in FIG. 6 wherein cell-covered areas 56 and 58 and 57 correspond to the light-colored areas 47, 49 and 50 of FIG. 5. The relatively thinly populated areas 60, 61, 62 and 63 on the slide correspond to the aforesaid dark surface areas 46, 48, 48a and 48b.

Figure 7:
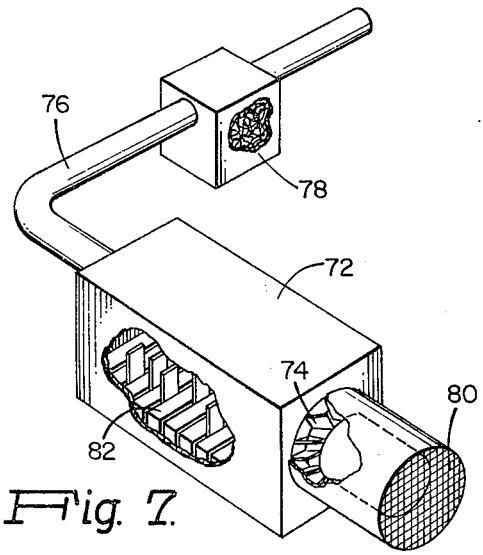
FIG. 7 shows apparatus suitable for use in accelerated cell-deposition procedures.

FIG. 7 illustrates apparatus whereby cell suspensions prepared according to the invention are enclosed in a housing 72. Air is forced into and distributed over these suspensions by fan 74 causing the requisite evaporation, consequent agitation and cell deposition. Air effluent passes through a conduit 76 and a cold trap 78 before being exhausted. The air carried through fan 74 is advantageous filtered as at 80 or otherwise treated to eliminate contamination of the cell samples. Evaporating samples are arrayed on trays 82 within the housing.

Figure 8:
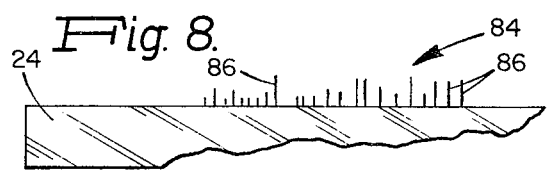
FIG. 8 is a grossly exaggerated cell distribution pattern showing the way in which cells tend to assume a three-dimensional position on the slide.

FIG. 8 shows a finished slide 84 suitable for long term storage and comprising, adhered thereto, a cell population wherein certain elongated or acicular cells 86 have tended to settle in a vertical position, thereby greatly facilitating microscopic inspection of the cell population. The mechanics by which this adhesion occurs is not fully understood. Nevertheless it is of high advantage in the preparation and handling of slides.

The following is an example of one highly useful embodiment of the invention, one in which cells obtained from a vaginal washing are prepared for microscopic inspection:

The cellular sample is asperated and placed in a tube containing an alcohol saline mixture, sent to a laboratory where it is spun down on a centrifuge. The supernatant liquid is discarded; the residual cellular material is suspended in ethanol. This much of the procedure is presently practiced in the art.

The ethanol suspension is diluted to a cell concentration of 70,000 per cc. A quantity of about 0.4 ml is placed in a steel ring of 0.5 inch diameter by 0.125 inch height. The steel ring sits on a glass slide. The room temperature is 75° F. This causes evaporation of the ethanol liquid suspending medium from the sample. The residue on the slide is adhesively bound thereto, but has an excellent cellular distribution and excellent cell orientation, as is apparent after the slide has been stained and subjected to microscopic examination.

It is a further object of the invention to provide a surprisingly advantageous cell-display article which is formed by the process of the invention and wherein the cells are adhesively attached to the slide, even acicular cells which, perhaps due to the buoyancy of the liquid medium and the fact the agitation keeps them from agglomerating, tend to orient in a vertical position.

The phoenomenon by which these cells attach so well to the slide is not understood but it is advantageous in the handling and storage of the cells.

By "pool" used in the claims is meant a body of liquid having sufficient depth to allow the thermal agitating described above. Usually a minimum depth of about 1/16 inch is required in the area over which the cells of said population are to be distributed and a width: depth ratio should be at least 1 to 1.

The use of the term "radiant-heat-absorbing" surface in the claims is meant to describe a dark-colored surface or other surface which absorbs heat-producing wavelengths of light. However, the term is not used in the precise functional sense. It has not been determined whether such a surface functions because of its radiation or its absorption of heat. Such surfaces are known to function well as both emitters and absorbers of radiant heat energy. Moreover, it will be obvious to one reading this application that the black-body can be placed at either surface of the transparent slide and, indeed can be integral with (i.e., attached to as painted or bonded onto) or be separate from the surface.

It is to be understood that the following claims are intended to cover all of the generic and specific features of the invention herein described, and all statements of the scope of the invention which, as a matter of language, might be said to fall therebetween.

What is claimed is:

1. A process for preparing cells for microscopic examination comprising the steps of
   a. forming a suspension of said cells in a liquid medium;
   b. forming a pool of said suspension on a display surface and within walls defining said pool, said pool being formed to a depth effective to allow thermal convection currents therein;
   c. evaporating the liquid medium at a rate effective to induce thermal currents in said pool during said evaporation, said currents circulating said cells and distributing them substantially uniformly within an area defined by said walls;
   d. and, upon evaporation of said liquid medium, leaving said cells uniformly dispersed upon said surface.

2. A process as defined in claim 1 wherein said pool has a depth of at least 1/16 inch and wherein said cell suspension comprises a volume not exceeding the volume of 125,000 cells per cc of 56 micron average particle diameter.

3. A process as defined in claim 2 wherein said display surface is a transparent slide and wherein a radiant-heat absorbing surface is positioned beneath said transparent slide to modify the evaporation steps so cells are preferentially distributed in areas which are congruent with areas of the slide beneath the pool which areas are incongruent with said radiant-heat-absorbing surface.

4. A process as defined in claim 3 wherein said shallow pool is formed by placing a wall-forming ring open at top and bottom thereof on a transparent slide and placing said suspension in said ring.

5. A process as defined in claim 4 wherein the surface of the ring is selected to be difficulty wettable by the suspension of cells.

6. A process as defined in claim 2 wherein said display surface is a transparent slide and wherein said pool is formed by placing a wall-forming ring open at top and bottom thereof on a transparent slide and placing a wall-forming ring open at top and bottom thereof on said transparent slide and placing said suspension in said ring.

7. A process as defined in claim 6 wherein said ring and slide are removably fastened together by liquid surface tension of liquid between the bottom of said ring and top of said slide.

8. A process as defined in claim 6 wherein the surface of the ring is selected to be difficulty wettable by the suspension of cells.

9. A process as defined in claim 2 wherein said evaporating step is carried out with a convex meniscus between said walls and said suspension.

10. A process as defined in claim 2 wherein said evaporating step is accomplished using evaporation-accelerating means.

11. A process as defined in claim 1 wherein said display surface is a transparent slide and wherein a radiant-heat absorbing surface is positioned beneath said transparent slide surface to modify the evaporation steps so cells are preferentially distributed in areas which are congruent with areas of the slide beneath the pool which are incongruent with said radiant-heat-absorbing surface.

12. A process as defined in claim 11 wherein said pool is formed by placing a wall-forming ring open at top and bottom thereof on a transparent slide and placing said suspension in said ring.

13. A process as defined in claim 12 wherein the surface of the ring is selected to be difficulty wettable by the suspension of cells.

14. A process as defined in claim 1 wherein said pool is formed by placing a wall-forming ring open at top and bottom thereof on a display surface and placing said suspension in said ring.

15. A process as defined in claim 14 wherein said ring and slide are removably fastened together by liquid surface tension of liquid between the bottom of said ring and top of said slide.

16. A process as defined in claim 14 wherein the surface of the ring is selected to be non-wettable by the suspension of cells.

17. A process as defined in claim 1 wherein said evaporating step is carried out with a convex meniscus between said walls and said suspension.

18. A process as defined in claim 1 wherein said evaporating step is accomplished using evaporation-accelerating means.

* * * * *